C. W. Blanchard.

Weaving Figured Fabric.

No. 253.

Reissued Jan. 3, 1854.

N. PETERS, PHOTO-LITHOGRAPHER, WASHINGTON, D. C.

UNITED STATES PATENT OFFICE.

CORNELIUS W. BLANCHARD, OF CLINTON, MASSACHUSETTS.

IMPROVEMENT IN LOOMS FOR WEAVING FIGURED FABRICS.

Specification forming part of Letters Patent No. 9,162, dated August 3, 1852; Reissue No. 253, dated January 3, 1854.

*To all whom it may concern:*

Be it known that I, CORNELIUS W. BLANCHARD, of Clinton, in the county of Worcester and State of Massachusetts, have invented certain new and useful Improvements in Looms for Weaving Figured Fabrics; and I do hereby declare the following to be a full, clear, and exact description of the same, reference being had to the accompanying drawings, making a part thereof, in which—

Figure 4:
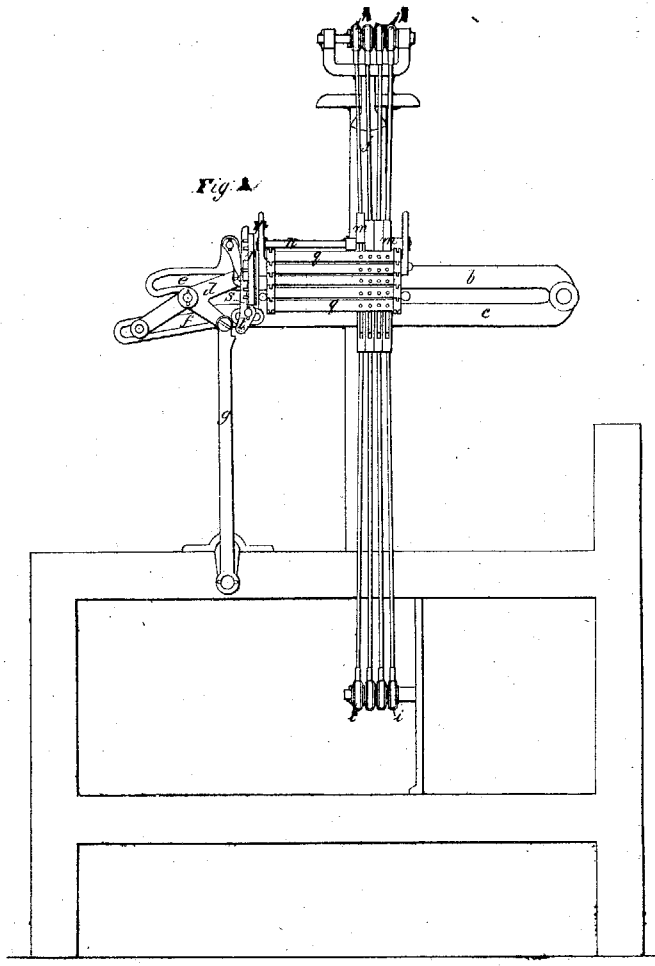
Figure 1:
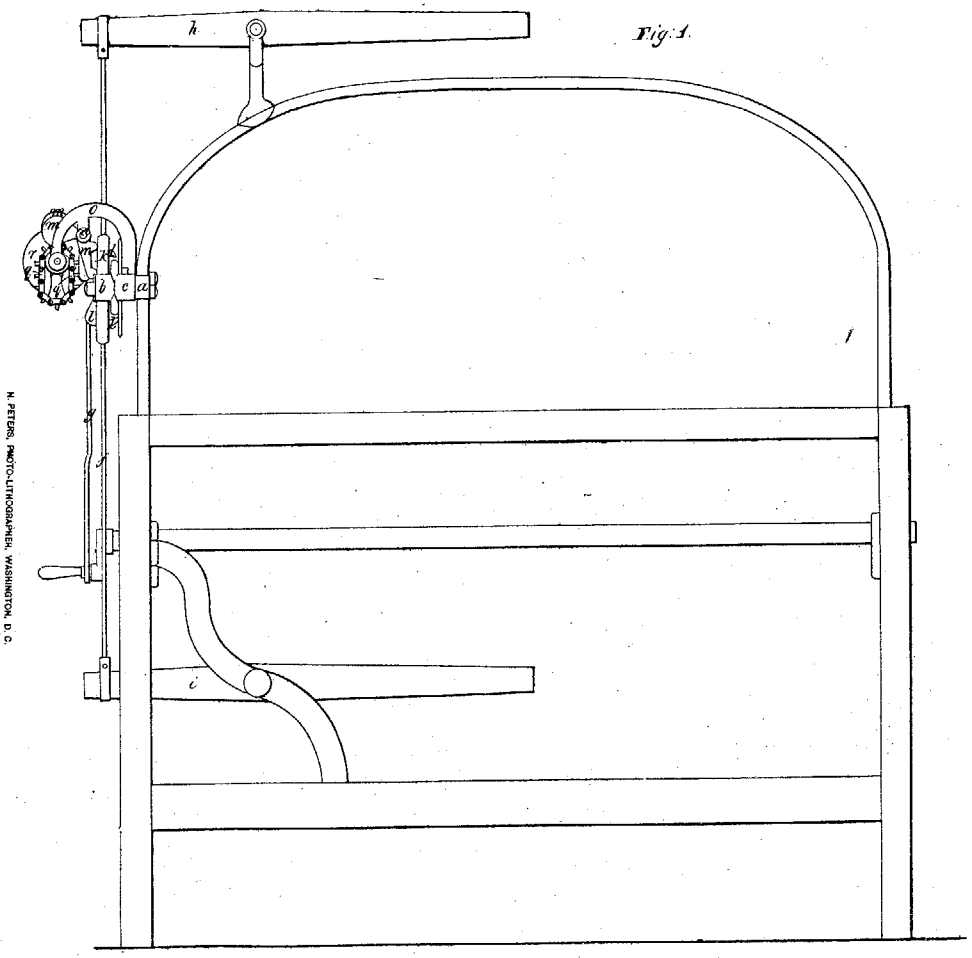

Figure 1 represents a view from the front of the loom. Fig. 2 represents a view from that end of the loom whereon the machinery for working the harness is arranged.

Similar letters in both the figures represent the same parts.

The nature of my invention consists, first, in the method of opening or raising and depressing the leaves of heddles by means of slotted levers or "catch-bars" oscillating about a fixed point or points and receiving motion from crank pins or studs upon the face of a wheel or ends of arms; secondly, in the method of connecting and disconnecting the leaves of heddles with the aforesaid oscillating levers, so as to raise or lower the leaves and form the shed; thirdly, in the arrangement of the parts for turning the figuring chain or cylinder, by which, under certain circumstances, it may be turned backward or forward by the operation of the loom.

To enable others skilled in the art to make and use my invention, I will proceed to describe the same with reference to the drawings.

The main stand or support *a* is bolted horizontally to the arch or gallows used in common looms for supporting the harnesses, and is placed at any convenient distance above the level of the top of the lay on the side of said arch or gallows.

*b c* are the slotted levers or catch-bars turning upon a stud or studs at the end of the stand *a* nearest the front side of the loom. *d* is a three-armed lever turning upon a stud at the opposite end of the stand *a*, and which carries upon the end of each of its arms a stud or crank-pin, the two pins upon the ends of the arms standing more directly opposite each other working in the slots *e f* in the catch-bars *b c*.

*g* is a connecting-rod which connects the third arm of the lever *d* with a crank upon the end of the common crank-shaft of the loom. The slots *e* and *f* are made concentric with the three-armed lever through a portion of their length, so that when the harness is fully opened it shall remain stationary for a time for the shuttle to pass. Upon turning the crank-shaft of the loom a reciprocating motion will be given to the connecting-rod *g*, which, being connected by a stud-pin to an arm of the aforesaid lever *d*, will cause that lever to turn upon its axis through a certain part of a revolution and then back again, and thus, through the agency of the stud-pins on the other arms working in the slots of the levers *b* and *c*, cause these levers to move angularly, one upward and the other downward, around their pivot at the other end of the main stand *a* and back again. The leaves of heddles are connected with jack-levers above and below, *h h* and *i i*, in the common way, and the outer ends of these jack-levers are connected from top to bottom by means of the rod *j*, consisting in part of wire and in part of the connecting-piece *k*. This connecting-piece *k* is hollow or slotted through a considerable part of its length to receive the double hook *l*, hung upon a pin passing through the middle of the hook and the slotted connecting-piece *k*. This hook is of sufficient length to catch upon either of the catch-bars *b c* when they are closed, and turns freely upon its axis. The hooks are placed outside of the catch-bars, and also the rods from the top to the bottom jack-levers; but these latter, with the connecting-pieces, may be placed inside the catch-bars, and the hooks hung upon ears projecting from the connecting-pieces through between the catch-bars. The pins upon which the hooks swing are placed in the middle of their length, but so far upon one side of their center of gravity as to cause their lower ends to swing inward and under the lower catch-bar when there is no obstruction, and consequently would be carried down by the motion of the catch-bar, if put in operation, and the harness attached to it through the jack-lever would be elevated. To connect these hooks with the upper catch-bar, I employ the bent lever, *m m*, turning upon a rod, *n*, which is supported by the two stands *o p*, bolted to the main stand *a*.

These bent levers may be made so that the weight of the end resting upon the figuring-cylinder may overcome the weight of the hooks, against which the other ends of the bent levers bear, or they may be operated upon by a spring in any one of a variety of ways sufficiently obvious to a mechancian. The bent levers are so placed that when their outer ends rest upon the bars of the figuring-chain their inner ends, which turn downward, shall press the upper ends of the hooks over the upper catch-bar when the catch-bars are closed. Consequently, when the catch-bar rises, the harnesses connected with such hooks as are pressed upon the upper catch-bar will be drawn down. The bent levers *m m* are raised from the bars of the figuring-chain by small wire pins inserted in the said bars, which as the chain is turned pass under the inclined plane of the end of the bent lever projecting over the chain.

The method of turning the chain in order to bring different sets of pins to act upon the bent levers at each successive shedding of the warp is as follows: Upon the end of the shaft or cylinder which supports and carries the figuring-chain, and which shaft is supported by the arched stands *o p*, I place a disk, *r*, having on its outer face—*i. e.*, on the side next the back of the loom—a number of pins arranged in a circle and corresponding to the number of sets of pins to be presented to the bent levers in a complete revolution of the shaft or cylinder aforesaid. Upon the lower catch-bar, *c*, is a stud projecting out nearly under these pins, and upon this stud I place a click, *s*, which, as this lever rises when the sheds are being closed, comes in contact with a pin or ratchet-tooth upon the disk aforesaid and pushes it round. The inner side of the click being beveled, as the catch-bar goes down again the click slides over the next pin or ratchet-tooth. This click has an elongation, *t*, projecting downward below the stud, on which it hangs, and which is so arranged with reference to the connecting-rod *g* that for a certain portion of the revolution of the crank-shaft of the loom this connecting-rod comes in contact with the elongation *t* of the click and presses it forward, throwing the upper end of the click back and away from the pins. This movement takes place ordinarily—*i. e.*, when the crank-shaft is revolving in its usual direction—when the catch-bars *b c* are opening, and therefore has no effect; but when the said shaft, for any purpose, is turned in a contrary direction this movement takes place when the bars are closing, and thus prevents the chain from being turned forward when the loom is going backward; but at such times it is desirable to turn the chain backward, and I therefore employ a second click, *u*, upon a stud on the top catch-bar opposite the first-mentioned one, which second click, when the first is thrown back, operates upon the pins on the disk when the bars are closing, and thus turns the chain backward.

To prevent the second click from engaging the pins when the first is not thrown back, a part of the body of the latter extends upward beyond that part which engages the pins, and at its end is beveled off wedge-shaped, so as to run between the top click and the disk-face, and throw it back sufficiently to clear the pins as the two clicks approach each other at the closing of the catch-bars. As the catch-bars have more motion at this point than the distance between the pins on the disk, the clicks slide on the face of the disk for a considerable distance before coming in contact with the pins, thus affording an opportunity for their being thrown back while the catch-bars are closing before meeting the pins.

By the above-described arrangement the operator can turn the chain backward or forward to any extent on ordinary looms by swinging the lay to and fro through a portion of its sweep by hand, giving thereby the crank-shaft a backward and forward motion. The clicks are pressed against the disk by helical springs coiled around their respective studs.

What I claim as new, and desire to secure by Letters Patent in the foregoing-described arrangement, is—

1. The combination of the angularly-moving catch-bars, operated substantially in the manner described, with the shifting hooks hung on the jacks so as to vibrate independently thereof, for the purpose of connecting and disconnecting the jacks with the said catch-bars.

2. The method, substantially as described, of combining and arranging the parts for turning the figuring chain or cylinder in either direction.

In witness whereof I have hereunto subscribed my name the 23d day of May, 1853.

C. W. BLANCHARD.

In presence of—

CHAS. W. RUNLET,
RUFUS D. WOOD.